US010756554B2

(12) United States Patent
Shim et al.

(10) Patent No.: US 10,756,554 B2
(45) Date of Patent: Aug. 25, 2020

(54) APPARATUS FOR CHARGING WEARABLE DEVICE

(71) Applicant: SAMSUNG ELECTRONICS CO., LTD., Suwon-si (KR)

(72) Inventors: Jae Wook Shim, Yongin-si (KR); Byung Hoon Ko, Hwaseong-si (KR); Jong Han Kim, Seoul (KR); Jong Wook Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 468 days.

(21) Appl. No.: 15/662,515

(22) Filed: Jul. 28, 2017

(65) Prior Publication Data
US 2018/0175643 A1 Jun. 21, 2018

(30) Foreign Application Priority Data

Dec. 21, 2016 (KR) .................. 10-2016-0175893

(51) Int. Cl.
H02J 7/00 (2006.01)
H01R 13/62 (2006.01)
H01R 103/00 (2006.01)
H01R 13/44 (2006.01)
H01R 13/64 (2006.01)
H01R 13/24 (2006.01)

(52) U.S. Cl.
CPC ............. *H02J 7/0042* (2013.01); *H02J 7/00* (2013.01); *H01R 13/2421* (2013.01); *H01R 13/44* (2013.01); *H01R 13/6205* (2013.01); *H01R 13/64* (2013.01); *H01R 2103/00* (2013.01); *H01R 2201/06* (2013.01)

(58) Field of Classification Search
USPC .................................... 320/108, 114
See application file for complete search history.

(56) References Cited

U.S. PATENT DOCUMENTS

| 7,311,526 | B2 | 12/2007 | Rohrbach et al. |
| 9,077,105 | B2 | 7/2015 | Kim |
| 9,362,775 | B1 | 6/2016 | Jacobs |
| 9,456,063 | B2 | 9/2016 | Mercando et al. |
| 9,549,051 | B2 | 1/2017 | Mercando et al. |
| 2004/0066611 | A1* | 4/2004 | Wu ................ G06F 1/1632 361/679.15 |

(Continued)

FOREIGN PATENT DOCUMENTS

| JP | 2000-175720 A | 6/2000 |
| JP | 2015-146705 A | 8/2015 |

(Continued)

*Primary Examiner* — Samuel Berhanu
(74) *Attorney, Agent, or Firm* — Sughrue Mion, PLLC

(57) ABSTRACT

An apparatus and a method for charging a wearable device is provided. The apparatus for charging a wearable device may include a power receiver disposed in the wearable device and configured to receive power and supply the power to the wearable device; a connector configured to comprise a first magnet and a magnetic member, wherein the first magnet is electrically connected to the power receiver through the magnetic member while the first magnet is attached to the power receiver by a first magnetic force; and a power supply configured to supply the power to the power receiver via the connector.

14 Claims, 11 Drawing Sheets

(56) References Cited

U.S. PATENT DOCUMENTS

| | | | |
|---|---|---|---|
| 2005/0134215 A1* | 6/2005 | Bozzone | H02J 7/0044 320/112 |
| 2006/0076921 A1* | 4/2006 | Kubota | H02J 7/0072 320/107 |
| 2012/0329532 A1* | 12/2012 | Ko | H02J 7/0044 455/573 |
| 2015/0222142 A1 | 8/2015 | Shirai | |
| 2017/0086017 A1 | 3/2017 | Mercando et al. | |

FOREIGN PATENT DOCUMENTS

| | | |
|---|---|---|
| JP | 2016-512671 A | 4/2016 |
| KR | 20-0379697 Y1 | 3/2005 |
| KR | 10-1072949 B1 | 10/2011 |
| KR | 10-1103028 B1 | 1/2012 |
| KR | 10-1171070 B1 | 8/2012 |
| KR | 10-1516321 B1 | 5/2015 |
| KR | 10-2016-0083407 A | 7/2016 |

* cited by examiner

APPARATUS FOR CHARGING WEARABLE DEVICE

CROSS-REFERENCE TO RELATED APPLICATION(S)

This application claims priority from Korean Patent Application No. 10-2016-0175893, filed on Dec. 21, 2016, in the Korean Intellectual Property Office, the entire disclosure of which is incorporated herein by reference for all purposes.

BACKGROUND

1. Field

The following description relates to charging an electronic device, and more particularly, to an apparatus for charging a wearable device.

2. Description of Related Art

A terminal may be classified as either a mobile/portable terminal or a stationary terminal depending on whether the terminal is typically movable during its intended use. The mobile/portable terminal may be further categorized as a handheld terminal or a vehicle mount terminal depending on whether a user can carry the terminal in person.

In recent years, a portable terminal carried by a user has evolved into a wearable device that can be worn on a user's body.

The wearable device has been implemented in the form of a multimedia device that performs various functions, such as shooting pictures or videos, playing music or video files, games, broadcast reception, and the like. However, as the wearable device is implemented in the form of a multimedia device having various functions, the battery consumption of the wearable device has also gradually increased.

A battery is a general power source to operate electronic devices embedded in a wearable device. The battery can supply stable power to the wearable device only after the battery is charged for a sufficient amount of time using a charger equipped with an adaptor. Thus, in order to ensure continuous use of wearable device, a regular charge and/or replacement of the battery is needed. Accordingly, once the user uses the wearable device for a certain period of time, the battery of the wearable device requires charging by connecting the wearable device to a charger. In this case, the user, however, has to endure the inconvenience of taking off the wearable device in order to charge the device. Thus, a method for continuous use of a wearable device without separating the wearable device from the body has been researched.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an aspect of an exemplary embodiment, there is provided an apparatus for charging a wearable device, including: a power receiver disposed in the wearable device and configured to receive power and supply the power to the wearable device; a connector configured to comprise a first magnet and a magnetic member, wherein the connector is electrically connected to the power receiver through the magnetic member while the first magnet is attached to the power receiver by a first magnetic force; and a power supply configured to supply the power to the power receiver via the connector.

The first magnet may be disposed to be electrically connected to a positive electrode and the magnetic member may be disposed to be electrically connected to a negative electrode.

The power supply may include the positive electrode and the negative electrode which are formed of a non-magnetic material. The first magnet may be disposed to be spaced apart from the positive electrode. The magnetic member may be fixed to the negative electrode.

The apparatus may further include a moving member that is affixed to the positive electrode and the negative electrode and an elastic body configured to keep the positive electrode away from the first magnet by applying an elastic force to the moving member.

The power receiver may include a second magnet disposed to have an opposite polarity to the first magnet and generate an attractive force toward the first magnet.

The power receiver may include a third magnet configured to attach the magnetic member thereto by a second magnetic force.

The first magnet may include a plurality of first magnets and the magnetic member may include a plurality of magnet members. The plurality of first magnets and the plurality of magnetic members may be alternately arranged along a circumference of the connector.

The first magnet and the magnetic member may be electrically insulated from each other.

The wearable device may be a wrist wearable device, headphones, glasses, or a neckband.

The apparatus may further include a flexible or stretchable power supply cable configured to electrically connect a power source to the power supply.

The power supply cable may be electrically connected to a keyboard or a mouse.

The power supply cable may be electrically connected to a wrist rest, which is integrated into a keyboard or a mouse.

The power receiver may be electrically connected to the wearable device through a power cable embedded in the wearable device.

According to an aspect of an exemplary embodiment, there is provided an apparatus for charging a wearable device, including: a connector including a first magnet and a magnetic member formed of a magnetic material; a power supply configured to supply power to the connector; and a power interrupter configured to shut off the power supplied from the power supply to the connector.

The first magnet may be disposed to be electrically connected to a positive electrode and the magnetic member may be disposed to be electrically connected to a negative electrode.

The power supply may include the positive electrode and the negative electrode which are formed of a non-magnetic material. The first magnet may be disposed to be spaced apart from the positive electrode, and the magnetic member may be fixed to the negative electrode.

The power interrupter may include a moving member, which is configured to be affixed to the positive electrode and the negative electrode, and an elastic body configured to keep the positive electrode away from the first magnet by applying an elastic force to the moving member.

The first magnet may include a plurality of first magnets and the magnetic member may include a plurality of magnet members. The plurality of first magnets and the plurality of magnetic members may be alternately arranged along a circumference of the connector.

The first magnet and the magnetic member may be electrically insulated from each other.

The apparatus may further include a flexible or stretchable power supply cable configured to electrically connect a power source to the power supply.

BRIEF DESCRIPTION OF THE DRAWINGS

The above and/or other aspects will become apparent and more readily appreciated from the following detailed description of exemplary embodiments, taken in conjunction with the accompanying drawings.

DETAILED DESCRIPTION

Figure 1:
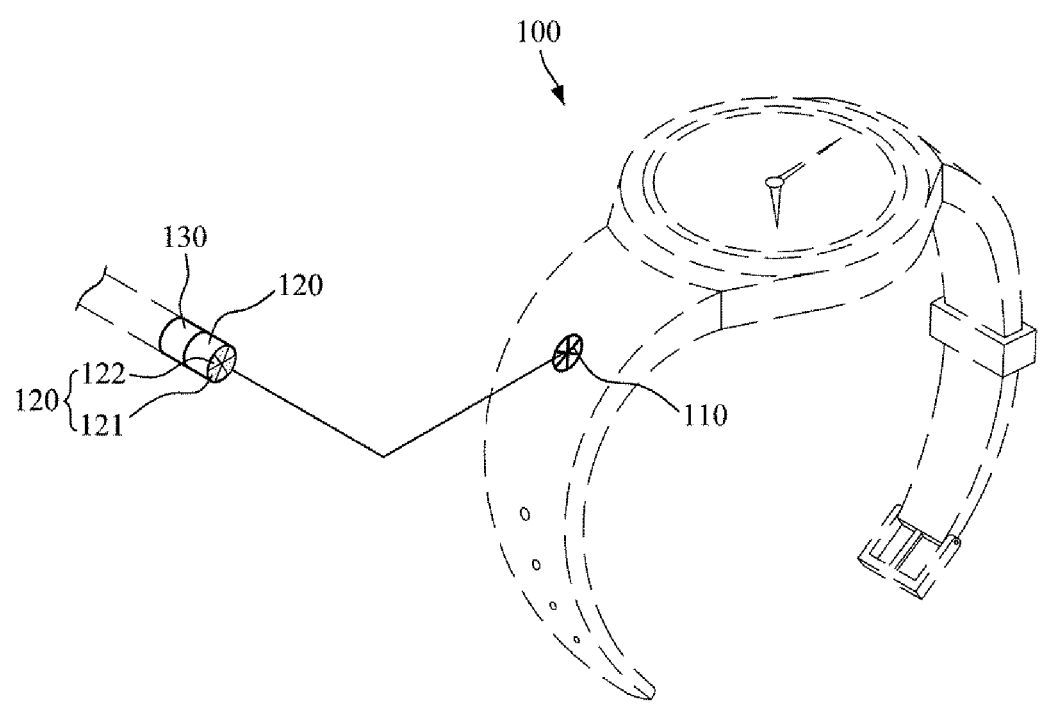
FIG. 1 is a perspective view illustrating an apparatus for charging a wearable device according to an exemplary embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 1 is a perspective view illustrating an apparatus for charging a wearable device according to an exemplary embodiment.

Referring to FIG. 1, the apparatus 100 for charging a wearable device includes a power receiver 110, a connector 120, and a power supply 130. FIG. 1 illustrates a wrist wearable device (e.g., a smartwatch) as an example of the wearable device. In FIG. 1, the wrist wearable device is arbitrarily selected to show one exemplary embodiment of the apparatus 100 for charging a wearable device, and the wearable device may be a wrist wearable device (e.g., a smartwatch), a headphone-type wearable device (e.g., a Bluetooth headset), an eye wearable device (e.g., smart glasses), or a necklace-type wearable device (e.g., Bluetooth earphones).

The power receiver 110 is disposed in the wearable device. The power receiver 110 may be embedded in a watch strap of the wrist wearable device, or may be, for example, on one surface of the watch strap of the wrist wearable device. In another example, the power receiver 110 may be disposed on one surface of the body of the wrist wearable device, or disposed on one surface of the body of a wrist wearable device having a different shape. In FIG. 1, the cross section of the power receiver 110 is circular, which is arbitrarily selected for convenience of description. The cross section of the power receiver 110 may be circular, triangular, rectangular, polygonal, or shaped otherwise. For example, in order to facilitate the connection or coupling between the power receiver 110 and the connector 120, the cross section of the power receiver 110 may be designed to have the same or similar shape, size, and configuration as those of the connector 120.

Meanwhile, the power receiver 110 may be formed in the shape of a groove that extends inward of the wearable device to facilitate the connection with the connector 120. For example, a fixing member protruding toward the outer side of the wearable device along the circumference of the power receiver 110 may be further included so that the power receiver 110 and the connector 120 are not easily detached from each other, or a coupling member for fixing the connector 120 and the power supply 130 which supplies power to the connector 120 to each other may be further included.

When the connector 120 is connected to the power receiver 110, the power receiver 110 may be physically and/or electrically connected with the connector 120 and the power supply 130. In addition, the power receiver 110 may supply power received from the connector 120 and the power supply 130 to the wearable device.

The connector 120 includes a first magnet 121 and a magnetic member 122. Here, the first magnet 121 may include a permanent magnet having magnetic properties such as MK magnetic steel, AlNiCo (i.e., an alloy of aluminum, nickel, cobalt and copper), KS steel, CuNiFe (i.e., an alloy of copper, nickel, and iron), and the magnetic member 122 may include a magnetic material (e.g., a ferromagnetic material such as iron (Fe), nickel (Ni), cobalt (Co)) that may not be a permanent magnet itself, but a material in which a force of attraction (e.g., magnetic force) may be generated when a magnet is placed within a certain distance from it.

The connector 120 includes the first magnet 121 and the magnetic member 122. When the connector 120 is connected or attached to the power receiver 110 by the magnetic force of the first magnet 121, the connector 120 may be electrically connected to the power receiver 110 through the first magnet 121 and the magnetic member 122 which are physically and/or electrically connected to the power supply 130. In this case, the first magnet 121 and the magnetic member 122 may have the property of a conductor through which electric current flows, and in particular, the first magnet 121 may have properties of both a magnetic material and a conductor.

Figure 2:
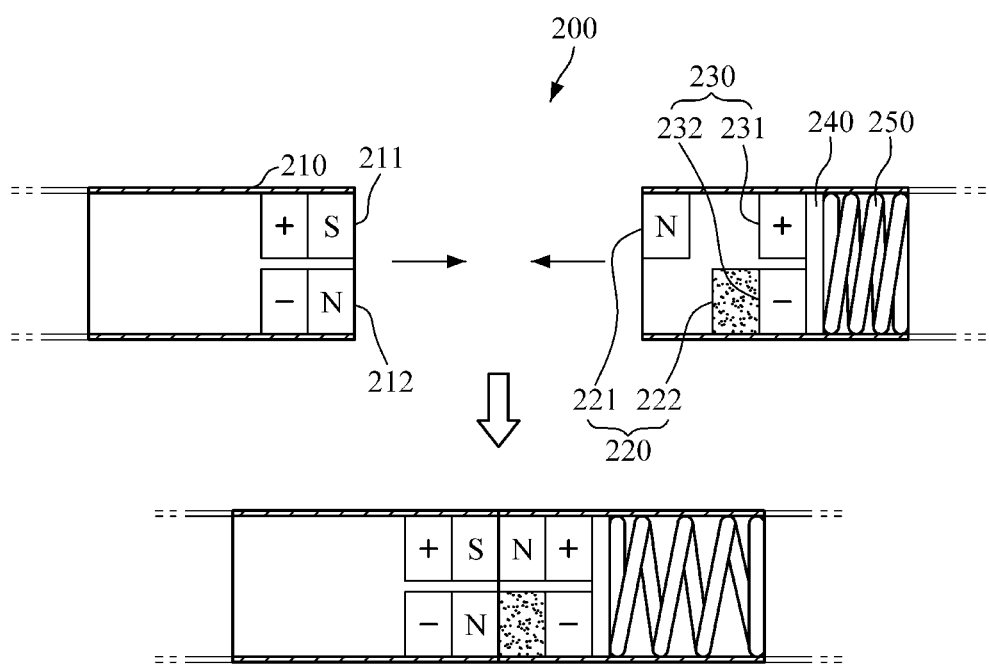
FIG. 2 is a cross-sectional view illustrating an apparatus for charging a wearable device according to an exemplary embodiment.

FIG. 2 is a cross-sectional view illustrating an apparatus for charging a wearable device according to an exemplary embodiment.

Referring to FIG. 2, the apparatus 200 for charging a wearable device includes a power receiver 210, a connector 220, a power supply 230, a moving member 240, and an elastic body 250.

In FIG. 2, a member denoted by N may be a permanent magnet disposed to exhibit characteristics of an N pole in a direction in which the power receiver 210 and the connector 220 are connected to each other. As such, in other drawings, the member denoted by N may be a permanent magnet showing characteristics of an N pole in a direction in which the power receiver 210 and the connector 220 are connected with each other, and the member denoted by S may be a permanent magnet showing characteristics of an S pole in a direction in which the power receiver 210 and the connector 220 are connected with each other. In addition, in the following description, an N-pole magnet may be a permanent magnet showing characteristics of an N pole in a direction in which the power receiver 210 and the connector 220 are connected with each other, and an S-pole magnet may be a permanent magnet showing characteristics of an S pole in a direction in which the power receiver 210 and the connector 220 are connected with each other.

Referring to FIG. 2, the power receiver 210 includes a second magnet 211 and a third magnet 212, and the connector 220 includes the first magnet 221 and the magnetic member 222. In this case, the second magnet 211 may be formed of a magnetic material, which is disposed to have an opposite polarity to the first magnet 221 and thereby generates attractive force toward the first magnet 221, and the third magnet 212 may be formed of a magnetic material to enable the magnetic member 222 to be attached thereto by magnetic force.

The power supply 230 may include a positive electrode 231 and a negative electrode 232. In this case, the positive electrode 231 may supply a positive (+) current and the negative electrode 232 may supply a negative (−) current. In addition, the positive electrode 231 and the negative electrode 232 are connected with a power source, thereby supplying power to the connector 220 and supplying power to the power receiver 210 through the connector 220.

The first magnet 221 may be disposed to be electrically connected to the positive electrode 231, and the magnetic member 222 may be disposed to be electrically connected to the negative electrode 232. In this case, the first magnet 221 may be an N-pole magnet or an S-pole magnet. The N-pole magnet illustrated in FIG. 2 is merely an example, and the magnet is not limited thereto. The disposition of the first magnet 221 to be electrically connected to the positive electrode 231 and the disposition of the magnetic member 222 to be electrically connected to the negative electrode 232 allow the positive and negative electrodes of the power receiver 210 to be electrically connected with the positive electrode 231 and the negative electrode 232 of the power supply 230, respectively, when the connector 220 is connected with the power receiver 210, as shown in FIG. 2. However, unlike what is shown in FIG. 2, the first magnet 221 may be disposed to be electrically conductive with regard to the negative electrode 232 and the magnetic member 222 may be disposed to be electrically conductive with regard to the positive electrode 231.

The power supply 230 may include the positive electrode 231 and the negative electrode 232, each of which may be formed of a non-magnetic material. In this case, the non-magnetic material may be a diamagnetic material, such as aluminum (Al), copper (Cu), or zinc (Zn), which is not affected (or is very weakly affected) by the magnetic field and thus is not magnetized. In addition, the arrangement of the positive electrode 231 and the negative electrode 232, each of which is formed of a non-magnetic material, is to prevent the short circuit between the power supply 230 and a magnetic body, caused by attractive force (e.g., magnetic force) by the magnetic body, other than the second magnet 211 and/or the third magnet 212 of the power receiver 210.

The first magnet 221 may be disposed to be spaced apart from the positive electrode 231, and the magnetic member 222 may be attached or fixed to the negative electrode 232. Because the positive electrode 231 is spaced apart from the first magnet 221, the power (current) supplied to the power supply 230 may be prevented from leaking before the power receiver 210, the connector 220 and the power supply 230 are physically and/or electrically connected with one another by attractive force generated between the magnetic member 222 and the third magnet 212, which are brought into close proximity to each other.

Meanwhile, the apparatus 200 for charging a wearable device further includes a moving member 240 which is affixed to both the positive electrode 231 and the negative electrode 232, and an elastic body 250 which applies an elastic force to the moving member 240 to keep the positive electrode 231 away from the first magnet 221. In this case, the moving member 240 may be a member (a component) exerting a force strong enough to move the positive electrode 231, which is not affected by the magnetic body, toward the power receiver 210 when the magnetic member 220 and the negative electrode 232, which is attached or fixed to the magnetic member 220, are moved toward the power receiver 210 by attractive force generated between the magnetic member 220 and the third magnet 212, which are brought into close contact with each other. The moving member 240 is not limited to a specific material and a specific shape but may be formed of any material and any shape so far as the material and the shape can perform the above function.

The elastic body 250 may be formed of a coil spring, a leaf spring, or the like. The elastic body 250 may be fixed to the moving member 240 in order to apply an elastic force to the moving member 240 and may be fixed to the opposite side of the moving member 240 in order to keep the positive electrode 231 to be kept away from the first magnet 221. In addition, although FIG. 2 shows only one elastic body 250 connected to the moving member 240, aspects of the present disclosure are not limited thereto, and a plurality of elastic bodies 250 may be connected to the moving member 240.

Because the moving member 240 is connected to the elastic member 250 which is affixed to both the positive electrode 231 and the negative electrode 232 and applies an elastic force such that the positive electrode 231 is kept at a distance away from the first magnet 221, the physical and/or electrical connection between the power receiver 210 and the connector 220 may be interrupted until an attractive force is applied between the third magnet 212 and the magnetic member 222.

For instance, as illustrated in the diagram at the bottom of FIG. 2, when the power receiver 210 comes in close contact (e.g., within a threshold distance) with the connector 220, an attractive force is generated between the second magnet 211 and the first magnet 221 and an attractive force is generated between the third magnet 212 and the magnetic member 222, so that the power receiver 210 and the connector 220 can be easily connected to each other. As such, a user is allowed to charge the wearable device by physically and/or electrically connecting the apparatus 200 to the wearable device only by bringing the power receiver 210 and the connector 220 close to each other, and hence the user convenience may be improved.

In another example, when an external metal substance (e.g., a metal substance that is not a permanent magnet), other than the power receiver 210, is brought into close contact with the power receiver 210, an attractive force may be generated between the external metal substance and the first magnet 221, but an attractive force is not generated between the external metal substance and the magnetic member 222. Therefore, it is possible to prevent the short circuit or leakage current which may be caused by physical and/or electrical connection between the power supply 230 and the external metal substance.

In yet another example, when an external N-pole magnet, other than the power receiver 210, is brought into close contact with the connector 220, a repulsive force (i.e., a pushing force) is generated between the external N-pole magnet and the first magnet 221 having the N polarity. Therefore, even when the external N-pole magnet and the magnetic member 222 are physically and/or electrically connected to each other by the attractive force generated between the external N-pole magnet and the magnetic member 222, the physical and/or electrical connection between the external N-pole magnet and the connector 220 may be completely or partially negated by the repulsive force generated between the external N-pole magnet and the first magnet 221, and thereby it is possible to prevent the short circuit or leakage current which may be caused by the external N-pole magnet, other than the power receiver 210.

As described above, the apparatus 200 for charging a wearable device includes the connector 220 which includes the first magnet 221 and the magnetic member 222, the power supply 230 which includes the positive electrode 231 made of a non-magnetic material and the negative electrode 232, the moving member 240, and a power interrupter 250 which includes the elastic body, so that it is possible to prevent the short circuit or leakage current which may be caused by any external object, other than the power receiver 210.

Figure 3:
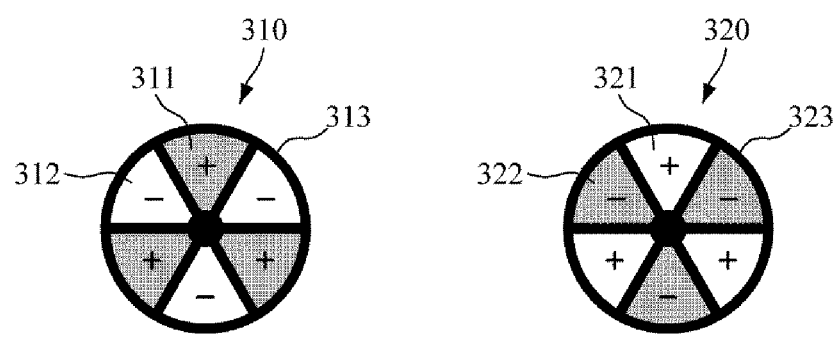
FIG. 3 is a diagram illustrating structures of cross sections of a power receiver and a connector according to an exemplary embodiment.

FIG. 3 is a diagram illustrating structures of cross sections of a power receiver and a connector according to an exemplary embodiment.

Referring to FIG. 3, a power receiver 310 may include a plurality of second magnets 311 and third magnets 312, which are alternately disposed along the circumference of the power receiver 310. In addition, a connector 320 may include a plurality of first magnets 321 and magnetic members 322, which are alternately disposed along the circumference of the connector 320. In FIG. 3, it is illustrated that three second magnets 311, three third magnets 312, three first magnets 321, and three magnetic members 322 are provided, which is merely one exemplary embodiment, and the numbers of the second magnets 311, the third magnets 312, the first magnets 321, and the magnetic members 322 are not limited thereto.

The connector 320 may further include an insulator 323, such as polyvinyl chloride (PVC), high-density polyethylene (HDPE), or epoxy resin, in order to electrically insulate between the first magnet 321 and the magnetic member 322.

That is, the first magnet 321 and the magnetic member 322 may be insulated from each other. In addition, the insulator is formed on an outer surface of the power receiver, so that the insulator can protect the electrodes from moisture in the air and an external impact, as does a protective covering. Meanwhile, the power receiver 310 may further include an insulator 313 to electrically insulate between the second magnet 311 and the third magnet 312.

In addition, the connector 320 may have a structure that corresponds to the structure of the cross section of the power receiver 310, as shown in FIG. 3, but this is merely one exemplary embodiment, and the structure of the cross section of the connector 320 may have a shape and/or a size which are different from those of the structure of the cross section of the power receiver 310.

Figure 4:
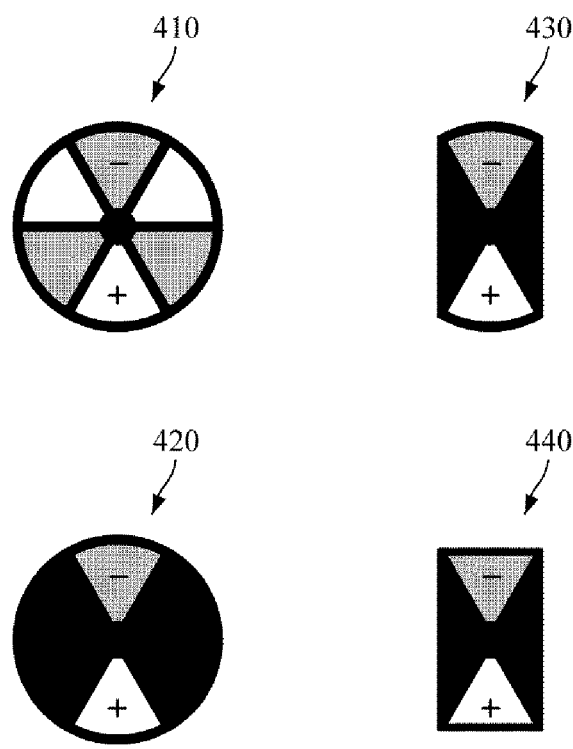
FIG. 4 is a cross-sectional view illustrating structures of cross sections of a power receiver and a connector according to an exemplary embodiment.

FIG. 4 is a cross-sectional view illustrating structures of cross sections of a power receiver and a connector according to an exemplary embodiment.

Referring to FIG. 4, the structure of the cross section of the power receiver and/or the connector is not limited to an isotropic structure shown in FIG. 3, and may be any one of various shapes as shown in FIG. 4.

As shown in the first structure 410, the power receiver may be disposed such that positive electrodes of the power receiver are electrically connected only to some of a plurality of permanent magnets, and negative electrodes of the power receiver are electrically connected only to some of a plurality of permanent magnets having an opposite polarity. In a similar manner, the connector may be disposed such that positive electrodes of the connector are electrically connected only to some of a plurality of first magnets and negative electrodes of the connector are electrically connected only to some of a plurality of magnetic members.

In addition, as shown in the second structure 420, the power receiver may be provided such that a positive electrode of the power receiver and a permanent magnet electrically connected to the positive electrode occupy only a partial area of the cross section of the power receiver and a negative electrode of the power receiver and a permanent magnet electrically connected to the negative electrode occupy only a part of the other area of the cross section of the power receiver. In a similar manner, the connector may be provided such that a positive electrode of the connector and a first magnet electrically connected to the positive electrode occupy only a partial area of the cross section of the connector and a negative electrode of the connector and a magnetic member electrically connected to the negative electrode occupy only a part of the other area of the cross section of the connector.

Also, the cross section of the power receiver and/or the connector may be the same as shown in the third structure 430 or the fourth structure 440. In the case of the third structure 430 and the fourth structure 440, the sizes of the cross sections of the power receiver and the connector can be reduced as compared with the first and the second structures 410 and 420 described above, and hence they can be utilized in a small-sized wearable device.

Figure 5:
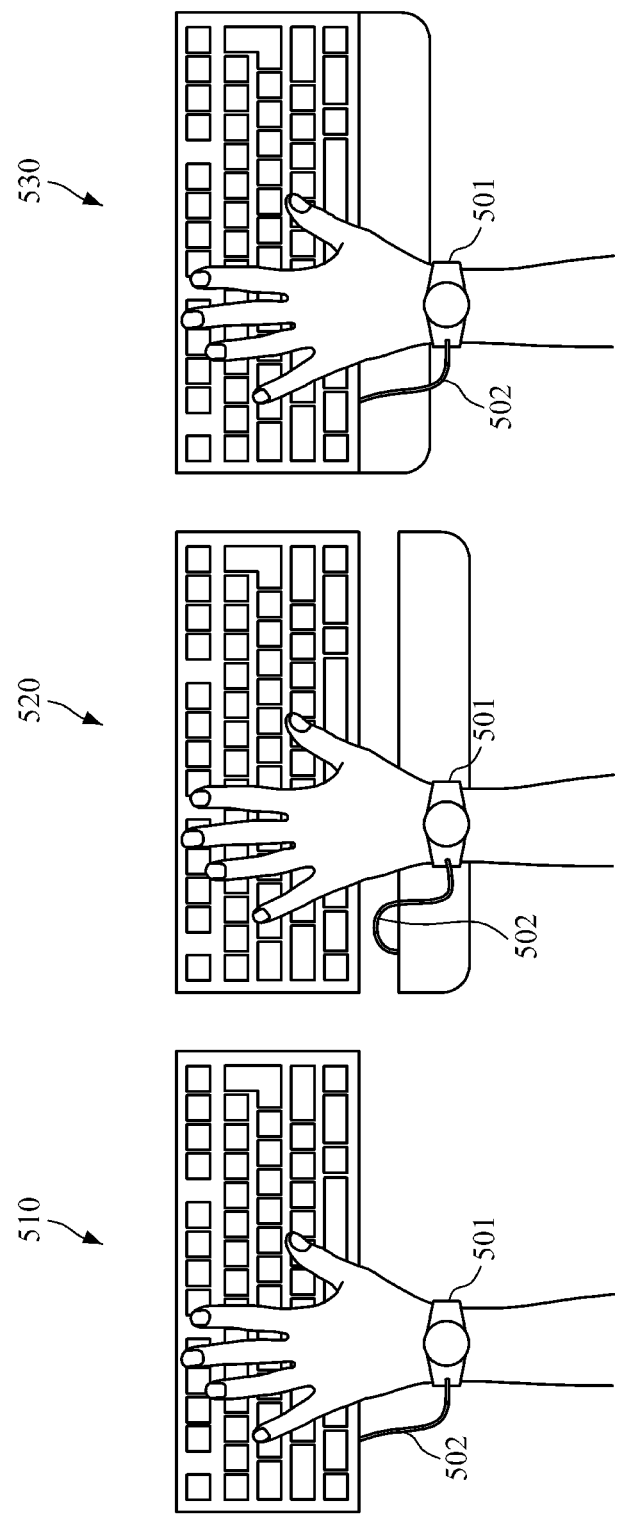
FIG. 5 is a diagram illustrating an apparatus for charging a wrist wearable device according to an exemplary embodiment.

FIG. 5 is a diagram illustrating an apparatus for charging a wrist wearable device according to an exemplary embodiment.

The apparatus 502 for charging a wearable device 501 may be a charging apparatus that supplies electric power to the wrist wearable device 501 as shown in a first embodiment 510, a second embodiment 520, and a third embodiment illustrated in FIG. 5.

The apparatus 502 may further include a power supply cable which is electrically connected to a power source. For example, the power supply cable may be made of a flexible or stretchable material. The power supply cable may have a covering (e.g., an insulation, a jacket, a sheath, etc.) made of a material such as rubber that can be bent. Alternatively, like the telephone cord, the power supply cable may have a stretchable structure or be formed of a stretchable material.

Referring to the first embodiment 510 of FIG. 5, the apparatus 502 for charging a wearable device may be physically and/or electrically connected to a keyboard. For example, the user may connect the wrist wearable device 501 to the apparatus 502 while using the keyboard connected to the apparatus 502, thereby being able to charge the wrist wearable device 501 while using the keyboard. In order to supply electric power to the apparatus 502, the keyboard may include a power cable connected to a power source.

Referring to the second embodiment 520 of FIG. 5, the apparatus 502 for charging a wearable device may be physically and/or electrically connected to a wrist rest.

Referring to the third embodiment 530 of FIG. 5, the apparatus 502 for charging a wearable device may be physically and/or electrically connected to a wrist rest integrated into the keyboard.

Accordingly, the user can charge the battery of the wearable device 501 using the apparatus 502 while the wearable device 501 is worn on the user's body.

Figure 6:
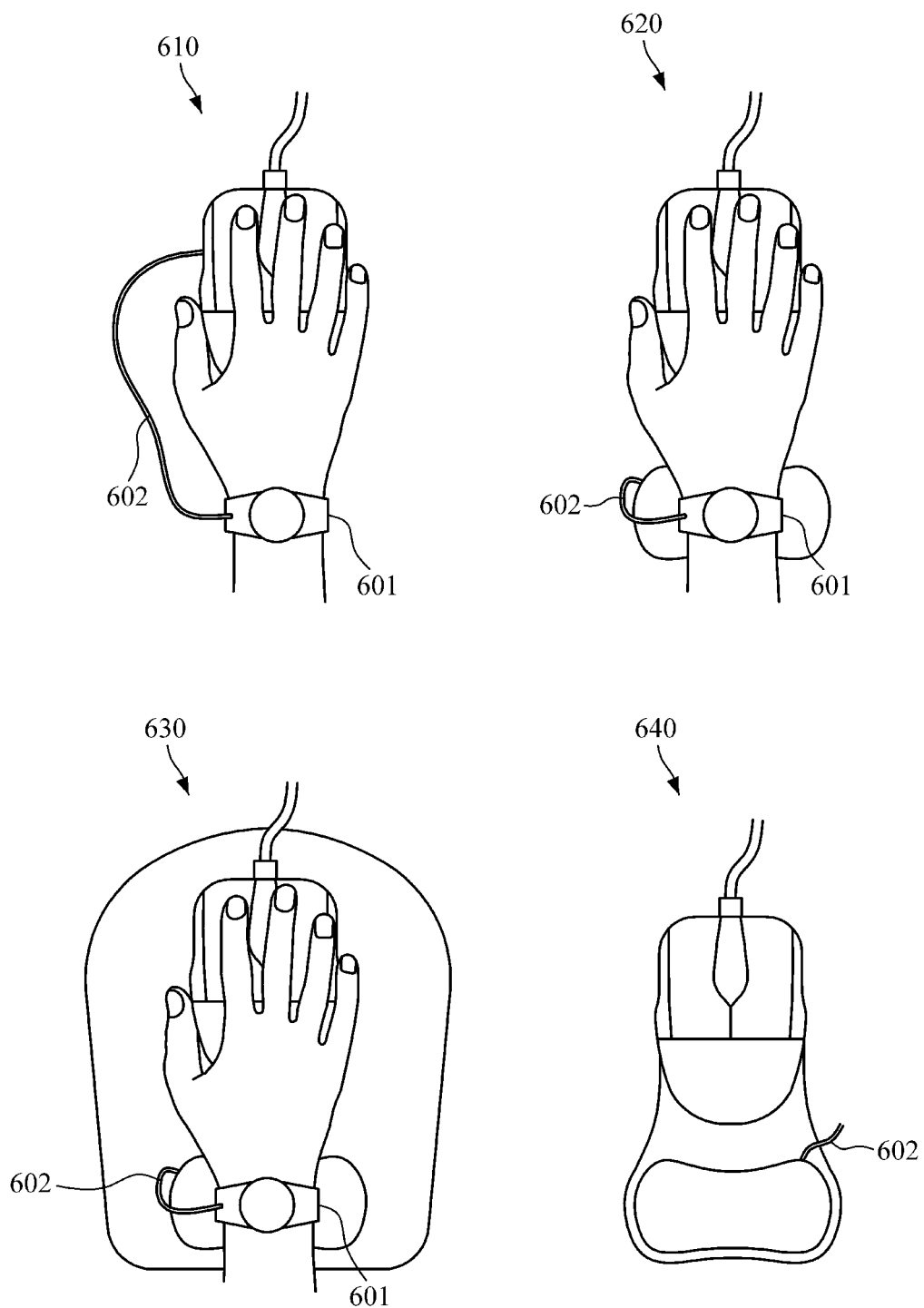
FIG. 6 is a diagram illustrating an apparatus for charging a wrist wearable device according to an exemplary embodiment.

FIG. 6 is a diagram illustrating an apparatus for charging a wrist wearable device according to an exemplary embodiment.

Referring to FIG. 6, the apparatus 602 for charging a wearable device may be a charging apparatus that supplies electric power to a wrist wearable device 601, as shown in a first embodiment 610, a second embodiment 620, a third embodiment 630, and a fourth embodiment 640 illustrated in FIG. 6.

Referring to the first embodiment 610 of FIG. 6, the apparatus 602 for charging a wearable device may be physically and/or electrically connected to a mouse. For example, a user may charge a wrist wearable device 601 while using the mouse by connecting the wrist wearable device 601 to the apparatus 602 connected to the mouse. Meanwhile, in order to supply electric power to the apparatus 602, the mouse may include a power cable connected to a power source.

Referring to the second embodiment 620 of FIG. 6, the apparatus 602 for charging a wearable device may be physically and/or electrically connected to a wrist rest.

Referring to the third embodiment 630 of FIG. 6, the apparatus 602 for charging a wearable device may be physically and/or electrically connected to a wrist rest integrated into a mouse pad.

Referring to the fourth embodiment 640 of FIG. 6, the apparatus 602 for charging a wearable device may be physically and/or electrically connected to a wrist rest integrated into a mouse.

Figure 7:
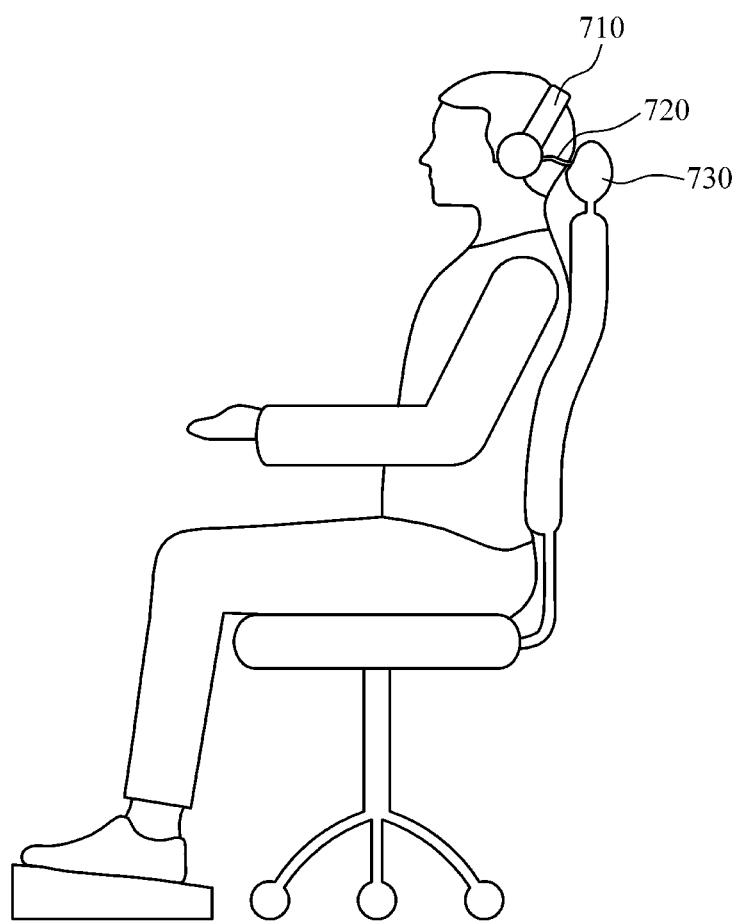
FIG. 7 is a diagram illustrating an apparatus for charging a wearable device in the form of a pair of headphones according to an exemplary embodiment.

FIG. 7 is a diagram illustrating an apparatus for charging a wearable device in the form of a pair of headphones according to an exemplary embodiment.

Referring to FIG. 7, an apparatus 720 for charging a wearable device in the form of headphones may be installed on a headrest part 730 of a chair. The user may charge a wearable device 710 in the form of a headphone by connecting the apparatus 720 installed on the headrest part 730 to the wearable device.

Figure 8:
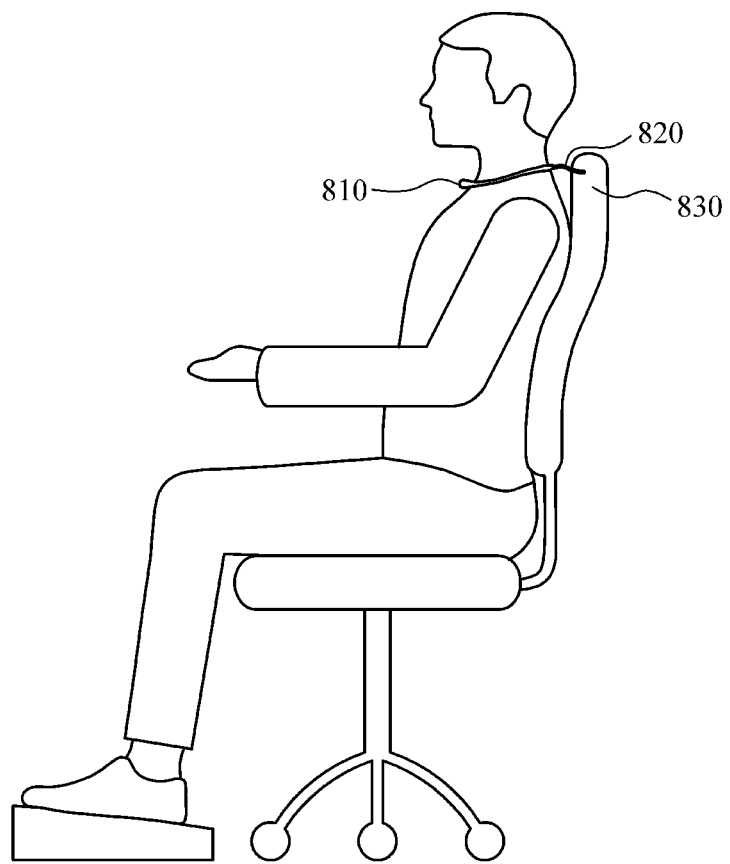
FIG. 8 is a diagram illustrating an apparatus for charging a wearable device in the form of a necklace according to an exemplary embodiment.

FIG. 8 is a diagram illustrating an apparatus for charging a wearable device in the form of a necklace according to an exemplary embodiment.

Referring to FIG. 8, the apparatus 820 for charging a wearable device 810 in the form of a necklace (e.g., a neckband- or neckloop-type headphones) may be installed on a backrest part 830 of a chair. A user may charge the wearable device 810 in the form of a necklace by connecting the apparatus 820 installed on the backrest part 830 to the wearable device 810.

Figure 9:
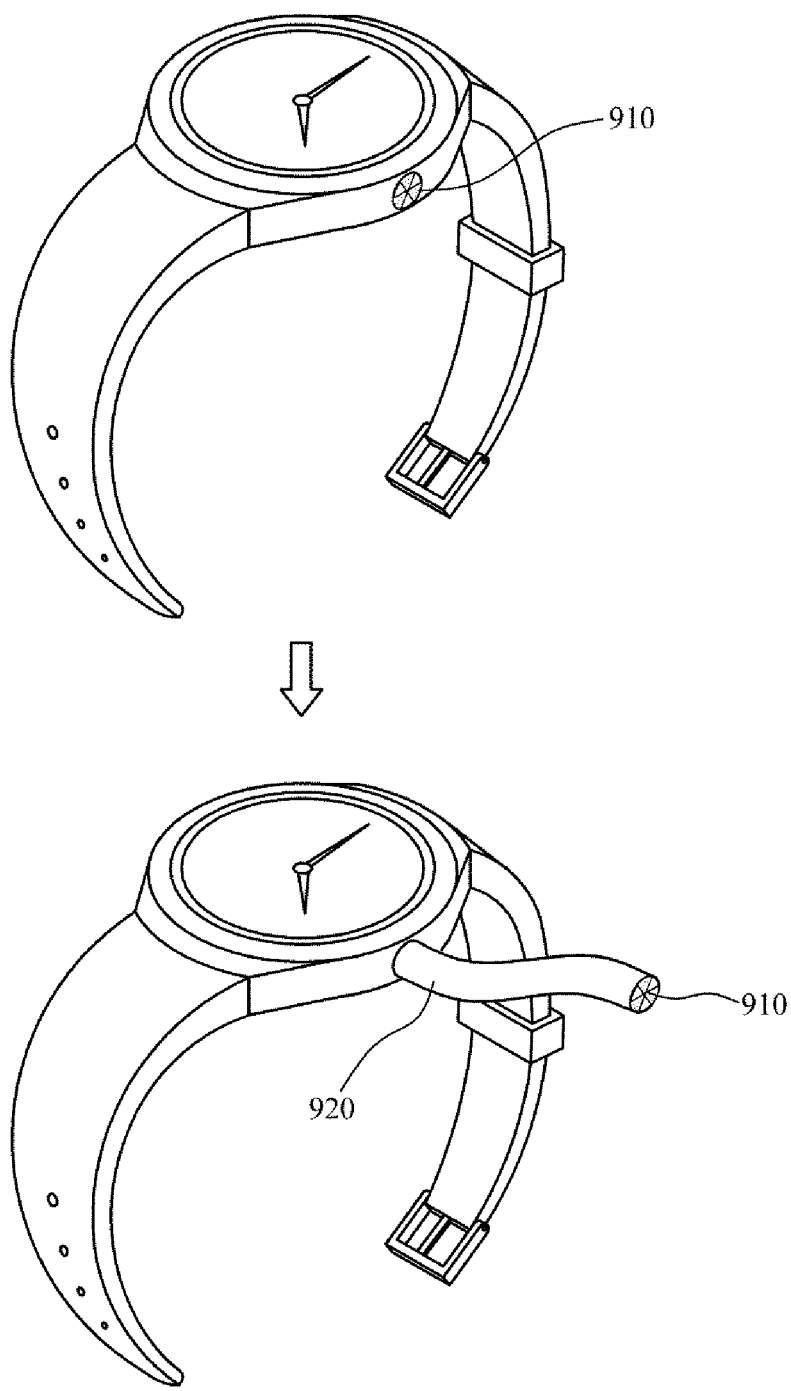
FIG. 9 is a diagram illustrating a power receiving cable according to an exemplary embodiment.

FIG. 9 is a diagram illustrating a power cable according to an exemplary embodiment.

Referring to FIG. 9, unlike FIG. 1, a power receiver 910 may be mounted in a body of a wearable device.

The power receiver 910 may be electrically and/or physically connected to the wearable device through a power cable 920 mounted in the wearable device. For example, the power cable 920 may be made of a flexible or stretchable material. The power cable 920 may have a covering (e.g., an insulation, a jacket, a sheath, etc.) made of a material such as rubber that can be bent. Alternatively, like the telephone cord, the power cable may have a stretchable structure or be formed of a stretchable material. Accordingly, the user may easily connect the power receiver 910 and a charging apparatus by stretching the power cable 920, as shown in FIG. 9.

Figure 10:
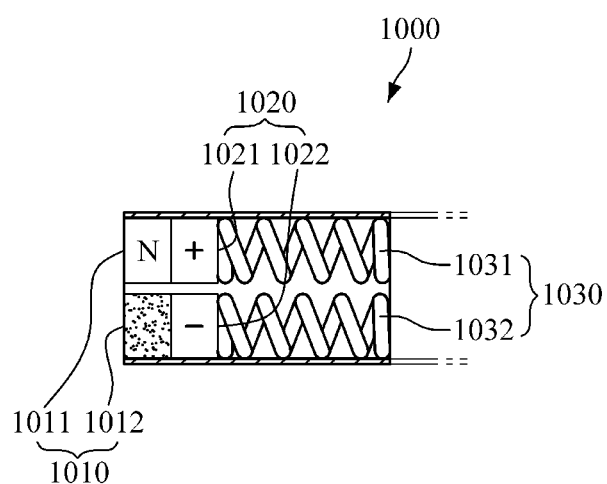
FIG. 10 is a cross-sectional view illustrating an apparatus for charging a wearable device according to an exemplary embodiment.

FIG. 10 is a cross-sectional view illustrating an apparatus for charging a wearable device according to an exemplary embodiment.

Referring to FIG. 10, an apparatus 1000 for charging a wearable device includes a connector 1010, a power supply 1020, and a power interrupter 1030. The connector 1010 and the power supply 1020 are the same as those described with reference to FIG. 1, and thus detailed descriptions thereof will be omitted.

The connector 1010 includes a first magnet 1011 and a magnetic member 1012 made of a magnetic material. In this case, the first magnet 1011 may include a permanent magnet having magnetic properties such as MK magnetic steel, AlNiCo (i.e., an alloy of aluminum, nickel, cobalt and copper), new KS steel, CuNiFe (i.e., an alloy of copper, nickel, and iron), and the magnetic member 1012 may include a magnetic material (e.g., a ferromagnetic material such as iron (Fe), nickel (Ni), cobalt (Co)) that may not be a permanent magnet itself, but a material in which a force of attraction may be generated when a magnet is placed within a certain distance from it.

The power supply 1020 may be physically and/or electrically connected to the connector 1010 to supply electric power, and the power interrupter 1030 may shut off power supplied from the power supply 1020 to the connector 1010. For example, the power interrupter 1030 may include a first spring 1031 connected to a positive electrode 1021 and a second spring 1032 connected to a negative electrode 1022.

A first magnet 1011 may be disposed to be electrically connected to the positive electrode 1021, and a magnetic member 1012 may be disposed to be electrically connected to the negative electrode 1022. In this case, the first magnet 1011 may be an N-pole magnet or an S-pole magnet. FIG. 10 illustrates an N-pole magnet, which is merely one exemplary embodiment, and thus the present description should not be construed as being limited to this embodiment. The first magnet 1011 may be disposed to be spaced apart from the positive electrode 1021, and a magnetic member 1012 may be fixed to the negative electrode 1022.

Figure 11:
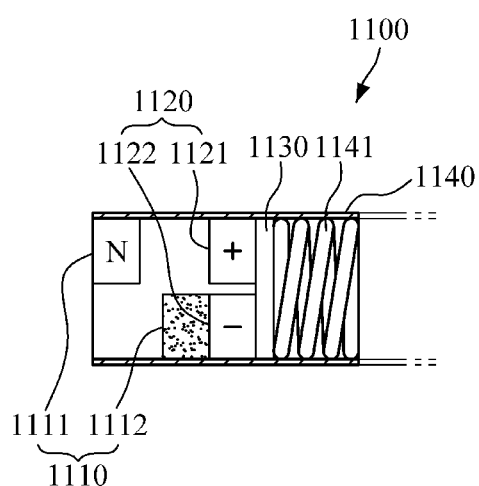
FIG. 11 is a cross-sectional view illustrating an apparatus for charging a wearable device according to an exemplary embodiment.

FIG. 11 is a cross-sectional view illustrating an apparatus for charging a wearable device according to an exemplary embodiment.

Referring to FIG. 11, a power supply 1120 includes a positive electrode 1121 and a negative electrode 1122, which are formed of a non-magnetic material. In this case, the non-magnetic material may be a diamagnetic material such as aluminum (Al), copper (Cu), or zinc (Zn), which is not affected (or very weakly affected) by the magnetic field and thus is not magnetized.

In addition, a first magnet 1111 may be disposed to be spaced apart from the positive electrode 1121, and a magnetic member 1112 may be fixed to the negative electrode 1122.

A power interrupter 1140 may include a moving member which is affixed to both the positive electrode 1121 and the negative electrode 1122, and an elastic body 1141 which applies an elastic force to the moving member to keep the positive electrode 1121 away from the first magnet 1111.

There may be a plurality of first magnets 1111 and magnetic members 1112 which are alternately disposed along the circumference of the connector 1110.

An insulator (PVE, HDPE, epoxy resin, or the like) may be provided to insulate between the first magnet 1111 and the magnetic member 1112. That is, the first magnet 1111 and the magnetic member 1112 may be insulated from each other. In addition, the insulator is formed on an outer surface of the power receiver, so that the insulator can protect the electrodes from moisture in the air and an external impact, as does a protective covering.

The apparatus 1100 for charging a wearable device may physically and/or electrically connect a power source and the power supply 1120. In addition, the apparatus 1100 may further include a flexible or stretchable power supply cable.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for charging a wearable device, the apparatus comprising:
    a power receiver disposed in the wearable device and configured to receive power and supply the power to the wearable device;
    a connector configured to comprise a first magnet and a magnetic member, wherein the connector is electrically connected to the power receiver through the magnetic member while the first magnet is attached to the power receiver by a first magnetic force; and
    a power supply configured to supply the power to the power receiver via the connector, and comprising a positive electrode and a negative electrode which are formed of a non-magnetic material,
    wherein the first magnet is disposed to be electrically connected to the positive electrode of the power supply and is disposed to be spaced apart from the positive electrode of the power supply,
    wherein the magnetic member is disposed to be electrically connected to the negative electrode of the power supply and is permanently fixed to the negative electrode of the power supply,
    wherein the apparatus further comprises a moving member that is affixed to the positive electrode and the negative electrode of the power supply; and an elastic body configured to keep the positive electrode of the power supply away from the first magnet by applying an elastic force to the moving member.

2. The apparatus of claim 1, wherein the power receiver comprises a second magnet disposed to have an opposite polarity to the first magnet and generate an attractive force toward the first magnet.

3. The apparatus of claim 1, wherein the power receiver comprises a third magnet configured to attach the magnetic member thereto by a second magnetic force.

4. The apparatus of claim 1, wherein the first magnet comprises a plurality of first magnets and the magnetic member comprises a plurality of magnetic members, the plurality of first magnets and the plurality of magnetic members being alternately arranged along a circumference of the connector.

5. The apparatus of claim 1, wherein the first magnet and the magnetic member are electrically insulated from each other.

6. The apparatus of claim 1, wherein the wearable device is one of a wrist wearable device, headphones, glasses, or a neckband.

7. The apparatus of claim 1, further comprising a power supply cable that is at least one of flexible and stretchable, the power supply cable being configured to electrically connect a power source to the power supply.

8. The apparatus of claim 7, wherein the power supply cable is electrically connected to at least one of a keyboard and a mouse.

9. The apparatus of claim 7, wherein the power supply cable is electrically connected to a wrist rest, which is integrated into at least one of a keyboard and a mouse.

10. The apparatus of claim 1, wherein the power receiver is electrically connected to the wearable device through a power cable embedded in the wearable device.

11. An apparatus for charging a wearable device, the apparatus comprising:
    a connector comprising a first magnet and a magnetic member, the magnetic member being formed of a magnetic material;
    a power supply configured to supply power to the connector, and comprising a positive electrode and a negative electrode which are formed of a non-magnetic material; and
    a power interrupter configured to shut off the power supplied from the power supply to the connector,
    wherein the first magnet is disposed to be electrically connected to the positive electrode of the power supply and is disposed to be spaced apart from the positive electrode of the power supply,
    wherein the magnetic member is disposed to be electrically connected to the negative electrode of the power supply and is permanently fixed to the negative electrode of the power supply, and
    wherein the power interrupter comprises a moving member, which is configured to be affixed to the positive electrode and the negative electrode of the power supply, and an elastic body configured to keep the positive electrode of the power supply away from the first magnet by applying an elastic force to the moving member.

12. The apparatus of claim 11, wherein the first magnet comprises a plurality of first magnets and the magnetic member comprises a plurality of magnetic members, the plurality of first magnets and the plurality of magnetic members being alternately arranged along a circumference of the connector.

13. The apparatus of claim 11, wherein the first magnet and the magnetic member are electrically insulated from each other.

14. The apparatus of claim 11, further comprising a power supply cable that is at least one of flexible and stretchable, the power supply cable being configured to electrically connect a power source to the power supply.

* * * * *